G. B. NELSON.
GOVERNOR.
APPLICATION FILED JUNE 20, 1908.
958,159.
Patented May 17, 1910.
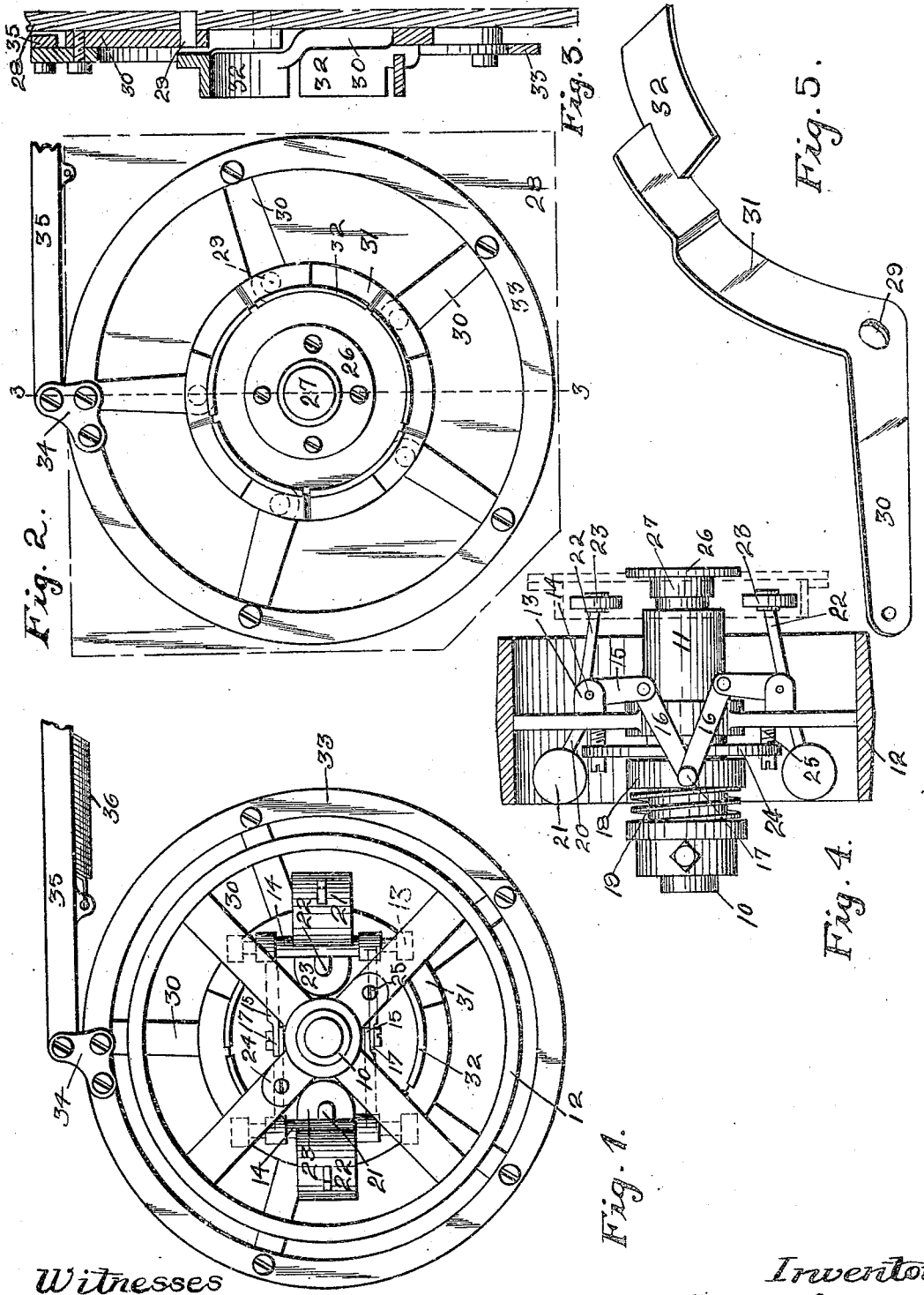

UNITED STATES PATENT OFFICE.

GEORGE B. NELSON, OF REDFIELD, IOWA.

GOVERNOR.

958,159.     Specification of Letters Patent.     Patented May 17, 1910.

Application filed June 20, 1908. Serial No. 439,570.

*To all whom it may concern:*

Be it known that I, GEORGE B. NELSON, a citizen of the United States, residing at Redfield, in the county of Dallas and State of Iowa, have invented a certain new and useful Governor, of which the following is a specification.

The object of my invention is to provide a governor of simple, durable and inexpensive construction designed to be applied to a rotary shaft and when the shaft is rotated to impart a longitudinal movement to an arm arranged at right angles to the shaft.

A further object is to provide a governor of this kind that will be comparatively sensitive and that will impart a comparatively long movement to said arm, so that upon a slight variation in the speed of the governor shaft, the arm will be affected.

My invention consists in the construction, arrangement and combination of the various parts of the device, whereby the objects contemplated are attained, as hereinafter more fully set forth, pointed out in my claims, and illustrated in the accompanying drawings, in which—

Figure 1 shows a side elevation of a governor embodying my invention. Fig. 2 shows a like view with the pulley wheel and the devices attached thereto removed to show the structure of the means for actuating the arm. Fig. 3 shows a detail view on the line 3—3 of Fig. 2. Fig. 4 shows a sectional view of the pulley to illustrate the governor balls and the mechanism connected therewith. The dotted lines in said figure show the position of the segmental plates relative to the wheels on the governor arms, and Fig. 5 shows an enlarged, detail, perspective view of one of the segmental plates and the lever connected therewith.

Referring to the accompanying drawings, I have used the reference numeral 10 to indicate a shaft, upon which a sleeve 11 is mounted. Fixed to the sleeve 11 is a pulley 12 of ordinary construction. This pulley has connected to its spokes the lugs 13 arranged in pairs, and in each pair of lugs is a shaft 14. At the ends of said shaft are the arms 15 extended inwardly toward the shaft. Pivoted to each of the arms 15 is a link 16, which links are extended toward each other and in a direction longitudinally of the shaft, and are pivotally connected at their inner ends by the bolts 17; said bolts also connect with a sliding collar 18 mounted on the hub 11. This collar is yieldingly held by a spring 19 toward the hub of the pulley.

Formed on or fixed to each of the shafts 14 is an arm 20 having a governor ball 21 thereon; and formed on or fixed to the opposite side of each of the shafts 14 is an arm 22 having a roller 23 thereon.

Adjacent to the sliding collar 18 is a plate 24 having two set-screws 25 therein designed to engage the adjacent spokes of the pulley. By the arrangement just described, it is obvious that when the pulley is stationary, the spring 19 will hold the collar 18 in a direction tending to hold the governor balls 21 to their inner limit of movement. This will hold the rollers 23 to their outer limit of movement. When the pulley is rotated the centrifugal action as applied to the governor balls will overcome the force of the spring 19 and the balls 21 will move outwardly toward the pulley and the rollers 23 will then move inwardly.

By means of the set-screws 25, the movement of the collar 18 may be limited upon the hub 11 and in this way the inward movement of the governor balls may be limited.

Adjacent to one end of the shaft 10 is a collar 26, fixed to a support 28, and having a short shaft 27 fixed to it. Pivoted to this support 28 is a series of levers arranged in a circle, each being pivoted at 29 to the support and each having a radially extended arm 30 and a curved arm 31 arranged substantially concentric relative to the shaft 27. On the end of each of the arms 31 is a segmental plate 32, said plates being also arranged concentrically relative to the shaft 27, said plates being of such size and shape that their ends will stand adjacent to each other, as clearly shown in Fig. 2. All of the arms 30 are pivotally connected to a ring 33 and attached to said ring is a lug 34 pivoted to an arm 35 which arm is extended at right-angles to the shaft 27. In Fig. 1 of the drawings, I have shown a spring 36 attached to said arm for yieldingly holding it in a direction tending to move the levers to position with the segmental plates 32 at their inner limit of movement.

By the arrangement just described, it is obvious that if the plates 32 are moved outwardly, the ring 33 will be moved in a direction tending to move the arm 35 in a direction opposite from that in which the spring 36 will operate, and when there is no outward pressure upon the plates 32, the spring 36 will tend to hold the plates to their inner limit of movement. The said plates are arranged relative to the rollers 23 in the manner shown by dotted lines in Fig. 4. Therefore, when the governor balls are at their outer limit of movement, the rollers 23 will project inwardly and will not engage with the plates 32, however, as the speed of the pulley 12 decreases, the governor balls will move inwardly on account of the spring 19, and the rollers 23 will move outwardly, whereupon said rollers will engage the segmental plates 32 and force them outwardly, thus imparting a movement in a straight line to the arm 35 against the action of the spring 36. It is obvious further that if there is a slight variation in the speed of the pulley 12, the arm 35 will be at once affected and said arm will be moved in one way by the rollers 23 engaging the plates 32 and in the other way by the spring 36.

By connecting all of the levers with the ring 33, they will necessarily operate in unison, and if the rollers 23 strike upon any of them the others will all be affected in the same way.

In practical use, it is obvious that when the pulley 12 is stationary the rollers 23 will be at their outer limit of movement and in engagement with the segmental plates 32, so that the arm 35 is also at one limit of its movement. Then when the pulley is rotated, the rollers 23 will move inwardly and thus permit the spring 36 to move the arm 35 to its opposite limit of movement. By means of the levers connected to the ring 33, a very slight outward movement of the segmental plates 32 will impart a comparatively long movement to the arm 35, hence a very sensitive governor is provided that will be affected by the slightest changes in speed of the pulley 12, and motion will be imparted to the arm 35 in a direction at right-angles to the shaft of the pulley. Furthermore, the length of stroke of the arm 35 may be quickly and easily regulated by means of the set-screws 25.

The improved governor herein illustrated and described is capable of successful use in connection with the conveyer shaft of a band cutter and feeder for threshing machines. It may also be used in connection with other devices in which it is desirable to control the speed of a rotatable shaft automatically.

I claim as my invention.

1. In a governor, the combination of a rotatable member, weighted levers connected therewith, said weights being arranged to move outwardly by centrifugal force, arms connected with said weighted levers, and arranged to move inwardly as the weights move outwardly, a series of levers arranged in a circle around the ends of said arms, said levers being fulcrumed to a support, and each having a substantially radial arm, and each also having an arm arranged substantially concentric to the said rotatable member, and in position to be engaged by the arms on the weighted levers, a ring pivotally connected with all of the said radially extended arms.

2. In a governor, the combination of a rotatable member, weighted levers fulcrumed thereto, arms on said levers arranged to move inwardly as the weights move outwardly, rollers on said arms, a support, a series of levers fulcrumed to the support and each having a substantially radially extended arm, and an arm extended substantially concentric relative to the rotatable member, said concentric arms being in position to be engaged by said rollers, a ring pivotally connected to all the radial arms, and an arm pivoted to said ring and extended in a direction substantially at right-angles to the axis of the rotatable member.

3. In a governor, the combination of a support, a series of levers fulcrumed to the support and arranged in a circle, said levers each having a radial arm, and an arm substantially concentric relative to the circle in which the said levers are fulcrumed, a ring connected to the radially extended arms of said levers, and rollers operated by centrifugal action for engaging the concentrically arranged portions of said levers.

4. A governor, comprising a series of levers arranged in a circle, each lever having a substantially radially extended arm and an arm extended substantially concentric relative to the circle in which the levers are fulcrumed, a segmental plate on each lever, said plates being arranged substantially in a circle, a ring connected to all of the levers, and rollers operated by centrifugal power for engaging said plates.

5. A governor, comprising a series of levers arranged in a circle, each lever having a substantially radially extended arm and an arm extended substantially concentric relative to the circle in which the levers are fulcrumed, a segmental plate on each lever, said plates being arranged substantially in a circle, a ring connected to all of the levers, and rollers operated by centrifugal power for engaging said plates, and a spring connected with said ring for normally holding the levers at one limit of their movement.

6. In a governor, the combination of a pulley, two levers fulcrumed to the spokes of the pulley, a governor weight on each lever, an arm fixed to each lever and extended inwardly, links pivoted to said arms, a collar slidingly mounted upon the pulley hub, and having said links pivoted to it, and set-screws connected with said collar to engage the spokes of the pulley for limiting the movement of the governor weights.

7. In a governor, the combination of a shaft, a pulley mounted upon the shaft, two levers fulcrumed to the pulley, each having a governor weight thereon, an inwardly projected arm fixed to each lever, links pivoted to said arms, a collar slidingly mounted upon the shaft, and having said links pivoted to it, and set-screws seated in said collar and designed to engage the pulley spokes for limiting the movement of the governor weights.

8. In a governor, the combination of a shaft, a pulley mounted upon the shaft, two levers fulcrumed to the pulley, each having a governor weight thereon, an inwardly projected arm fixed to each lever, links pivoted to said arms, a collar slidingly mounted upon the shaft, and having said links pivoted to it, and set-screws seated in said collar and designed to engage the pulley spokes for limiting the movement of the governor weights, and a spring arranged to yielding hold the collar in a direction toward the pulley spokes.

9. In a governor, the combination of a pulley shaft, a sleeve mounted on the pulley shaft, a pulley fixed to the sleeve, two shafts mounted in the pulley spokes on opposite sides of the pulley shaft, a weighted arm fixed to each of said shafts, two arms fixed to the ends of each shaft and extended inwardly toward the pulley shaft, a link pivoted to each arm, a collar slidingly mounted upon said sleeve and having said links pivoted to it, a spring for yieldingly holding the collar toward the pulley spokes, set-screws seated in said collar and designed to engage the spokes of the pulley for the purposes stated.

Des Moines, Iowa, June 2, 1908.

GEORGE B. NELSON.

Witnesses:
RALPH ORWIG,
MILDRED B. GOLDIZEN.